United States Patent
Matsumoto (10) Patent No.: US 10,870,450 B2
(45) Date of Patent: Dec. 22, 2020

(54) VEHICLE CONTROL APPARATUS

(71) Applicant: DENSO CORPORATION, Kariya, Aichi-pref. (JP)

(72) Inventor: Yusuke Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 16/232,836

(22) Filed: Dec. 26, 2018

(65) Prior Publication Data

US 2019/0193787 A1    Jun. 27, 2019

(30) Foreign Application Priority Data

Dec. 27, 2017   (JP) ................................. 2017-252545

(51) Int. Cl.
  *B62D 15/02*   (2006.01)
  *G06K 9/00*    (2006.01)
  *B62D 6/00*    (2006.01)

(52) U.S. Cl.
  CPC ............. *B62D 15/025* (2013.01); *B62D 6/00* (2013.01); *G06K 9/00798* (2013.01)

(58) Field of Classification Search
  CPC ..... B62D 15/025; B62D 6/00; G06K 9/00798
  See application file for complete search history.

(56) References Cited

U.S. PATENT DOCUMENTS

| | | | | |
|---|---|---|---|---|
| 7,124,027 B1* | 10/2006 | Ernst, Jr. | ............... | G01S 13/931 701/301 |
| 9,623,901 B2* | 4/2017 | Takeda | ............... | G06K 9/00798 |
| 2007/0191997 A1* | 8/2007 | Isaji | ...................... | B60W 30/16 701/1 |
| 2008/0040004 A1* | 2/2008 | Breed | ................... | G01S 13/931 701/45 |
| 2010/0318254 A1* | 12/2010 | Yamamura | ............ | B60W 40/12 701/31.4 |
| 2015/0165973 A1* | 6/2015 | Takemae | ................... | B60R 1/00 348/148 |
| 2016/0121889 A1 | 5/2016 | Shimomura et al. | | |
| 2018/0032082 A1* | 2/2018 | Shalev-Shwartz | .......................... | G05D 1/0055 |
| 2018/0105171 A1* | 4/2018 | Tsuji | ...................... | B60W 30/14 |

FOREIGN PATENT DOCUMENTS

| | | |
|---|---|---|
| JP | H11007534 A | 1/1999 |
| JP | 4217900 B2 | 2/2009 |

* cited by examiner

*Primary Examiner* — Behrang Badii
*Assistant Examiner* — Daniel L Greene
(74) *Attorney, Agent, or Firm* — Maschoff Brennan (57) ABSTRACT

A vehicle control apparatus estimates a curvature of the own lane ahead of the own vehicle based on both left and right markings in a captured image and performs a steering control of the own vehicle based on the estimated curvature of the own lane. The control unit determines the direction of the own vehicle and determines whether a change in the road slope is present. When the vehicle control apparatus determines that the direction of the own vehicle changes and the road slope ahead of the own vehicle changes, the vehicle control apparatus applies a restriction to the steering control performed based on the curvature of the own lane.

11 Claims, 8 Drawing Sheets

VEHICLE CONTROL APPARATUS

CROSS-REFERENCE TO RELATED APPLICATION

This application is based on and claims the benefit of priority from earlier Japanese Patent Application No. 2017-252545 filed Dec. 27, 2017, the description of which is incorporated herein by reference.

BACKGROUND

Technical Field

The present disclosure relates to a vehicle control apparatus that performs a steering control of a vehicle.

Description of the Related Art

As a related art, for example, Japanese Patent Number 4217900 discloses an apparatus for performing a steering control of an own vehicle in which a curvature corresponding to a shape of the own lane is estimated to perform the steering control based on the estimated curvature. As a method for estimating a curvature of the own lane, a method is known in which a marking is detected from an image that captures ahead of the own vehicle and the curvature of the own lane is estimated using the detected marking.

However, depending on a road situation and the direction of the own vehicle, the curvature of the own lane may not be correctly estimated and thus cause deterioration of the steering control. For example, when a down slope is present ahead of the own vehicle on a road, the marking in the captured image is distorted. Moreover, in the case where the own vehicle is travelling on such a down slope road and approaches one of both left and right side markings when the own vehicle changes its direction in either the left or right direction, a degree of distortion differs between respective side markings in the captured image. Hence, due to the difference of degree of distortion of respective one side markings, an unnecessary steering amount may be applied to the own vehicle.

SUMMARY

The present disclosure has been achieved in light of the above-described circumstances and provides a vehicle control apparatus that avoids unnecessary steering amount applied to the own vehicle when the own vehicle travels on a road having a road slope.

The vehicle control apparatus according to the present disclosure is provided with a marking detection unit that detects a marking defining an own lane based on an image of a region ahead of an own vehicle captured by an imaging device; a curvature estimation unit that estimates a curvature of the own lane ahead of the own vehicle based on both of left and right markings detected by the marking detection unit; a control unit that performs steering control of the own vehicle based on the curvature of the own lane estimated by the curvature estimation unit; a change determination unit that determines whether a direction of the own vehicle has changed with respect to a direction where the own lane extends; and a slope determination unit that determines whether a change in a road slope is present ahead of the own vehicle. The control unit is configured to apply a restriction to the steering control performed based on the curvature of the own lane during a state where a change in the direction of the own vehicle has been detected and a change in the road slope ahead of the own vehicle has been detected.

When the own vehicle travels on a road having a road slope and changes its direction to approach either of the left and right markings, in the captured image, an opposite side marking with respect to the direction of the own vehicle is distorted and deformed in the vehicle width direction compared to the own vehicle side marking. Hence, due to the difference of degree of distortion between respective one side markings, an error may occur on the estimated curvature of the road to cause an unnecessary steering amount to be applied to the own vehicle. In this regard, according to the above-described configuration, the apparatus determines whether a direction of the own vehicle has changed with respect to a direction in which the own lane extends, and determines whether a change in the road slope ahead of the own vehicle is present. Then, when determining that the direction of the own vehicle changes and the road slope changes ahead of the own vehicle, the apparatus applies a restriction to the steering control based on the curvature of the own lane. In this case, the own vehicle can be prevented from being applied with an unnecessary steering amount depending on a difference of degree of distortion between the left and right markings in the captured image.

DETAILED DESCRIPTION OF THE PREFERRED EMBODIMENTS

First Embodiment

Figure 1:
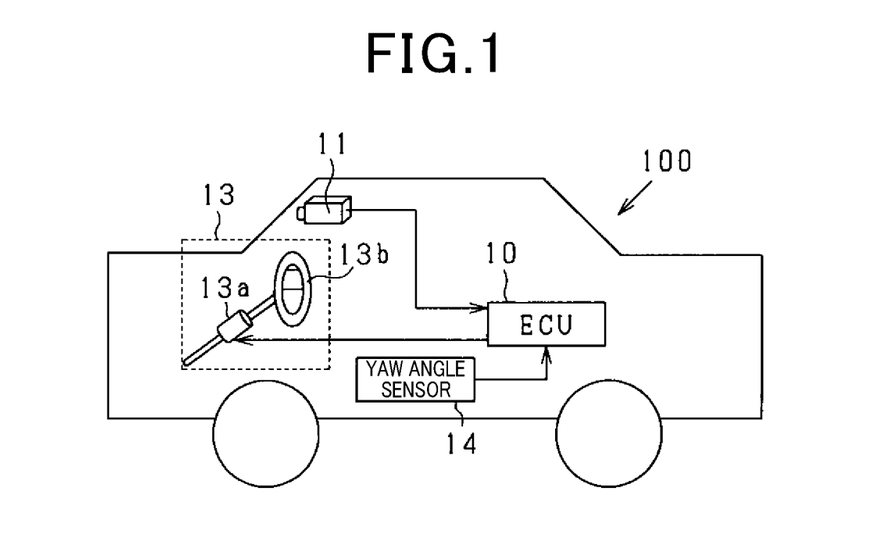
FIG. 1 is a diagram showing a steering control system according to embodiments of the present disclosure.

With reference to FIG. 1, a steering control system 100 applied to a vehicle will be described. The steering control system 100 is provided with an ECU 10, an imaging device 11, a steering apparatus 13 and a yaw angle sensor 14. According to the present embodiment, the ECU 10 corresponds to a vehicle control apparatus.

The imaging device 11 is attached to the own vehicle in a center position of the vehicle width direction at a predetermined height, whereby an area ahead of the own vehicle spreading in a predetermined angle range is captured as a bird's-eye view, and the captured image is outputted to the ECU 10. The imaging device 11 is configured as, for example, a CCD (charge coupled device) camera, a CMOS (complementary metal oxide semiconductor) image sensor and an infrared camera. Note that the imaging device 11 is a monocular camera according to the present embodiment, but a stereo camera can be used.

The steering apparatus 13 is provided with a steering 13b, and a steering motor 13a. The steering motor 13a generates a steering torque for steering the driving wheels included in the own vehicle. The larger the steering torque, the larger the steering amount of own vehicle is.

The ECU 10 is a computer provided with CPU, RAM, ROM and I/O. The CPU executes a program installed in the ROM, thereby performing a steering control to the vehicle. According to the present embodiment, the ECU 10 executes a lane keeping assist (LKA) control having the vehicle travel in accordance with a marking line that defines the own lane. In the LKA control, the ECU 10 estimates a road curvature of the own lane by using a detected marking in the captured image, and sets the steering amount of the steering apparatus 13 based on the estimated road curvature.

The ECU 10 detects the marking based on a feature quantity such as luminance in the captured image. Specifically, the ECU 10 extracts edge points of the marking from the captured image, performs Hough transformation to the extracted plurality of edge points, and acquire series of edge points which are candidates of the marking. Then, the ECU 10 calculates a degree of existence of feature as a marking for each of the plurality of markings, and detects a candidate having the largest degree of existence of the feature to be the marking. According to the present embodiment, the ECU 10 corresponds to marking detection unit.

The ECU 10 estimates a road curvature of the own lane based on a marking included in a predetermined section among the detected markings using the captured image. According to the present embodiment, the ECU 10 detects the center points between the left and right markings at predetermined intervals, from a front area of the own vehicle to a distance area ahead of the own vehicle. Then, the ECU 10 calculates an approximation formula of a line connecting the detected center points, and estimates the road curvature. The ECU 10 estimates the road curvature based on the marking ahead of the own vehicle at a predetermined period. Then, the ECU 10 performs smoothing processing of the road curvature calculated at the current period, and estimates the smoothed road curvature to be a current estimated value of the road curvature. For example, as the smoothing process, a weighted average or a moving average can be used.

Also, the ECU 10 estimates the road curvature based on a marking of one side (one side marking) in the left and right markings, when detecting only one side marking in the left and right markings from the captured image. For example, the ECU 10 calculates an approximation formula that approximates detected one of the left and right markings, and estimates the road curvature by using the calculated approximation formula. The ECU 10 corresponds to curvature estimation unit.

The ECU 10 sets, based on the estimated road curvature, a target steering amount Ta and a steering change rate R indicating a change rate of the steering amount. According to the present embodiment, the target steering amount Ta and the steering change rate R are set using a road curvature of a lane section from a current location of the own vehicle to a location at which the own vehicle reaches when a predetermined period elapses. Hereinafter, among road curvatures used for setting the target steering amount Ta and the steering change rate R, a road curvature estimated based on both left and right markings is referred to as a first curvature $\rho1$ and a road curvature estimated based on only one of the left and right markings is referred to as a second curvature $\rho2$.

Figure 2:
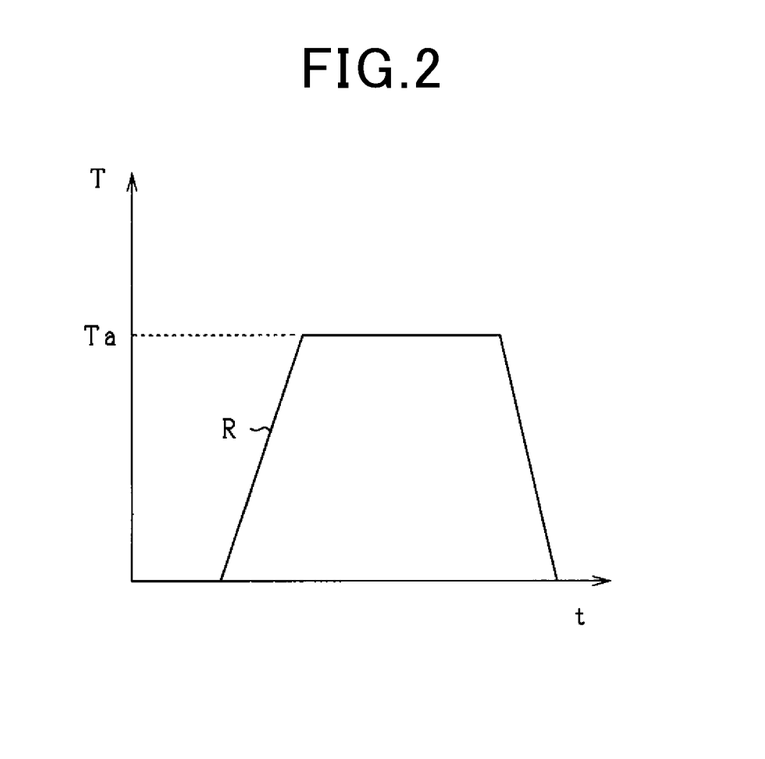
FIG. 2 is a graph showing a steering amount set by ECU (electronic control unit)

FIG. 2 is a timing diagram of a steering amount T in which the vertical line shows the steering amount T. As shown in FIG. 2, the target steering amount Ta shows a maximum value of the steering amount required for the current steering operation. According to the present embodiment, the target steering amount Ta is set to be a value where a predetermined gain K1 is added to the road curvature. The steering change rate R shows a change rate of the steering amount T per unit of time. Specifically, the change rate R indicates respective change rates of the steering amount when the steering amount T increases to the target steering amount Ta and when the steering amount T decreases from the target steering amount ta.

Note that the ECU 10 may set the target steering amount Ta such that a value where the gain K1 is added to the road curvature, and a value where the gain K2 is added to a horizontal deviation $\Delta y$ are added to obtain the target steering amount Ta. The horizontal deviation $\Delta y$ represents a difference of the distance between the center of the own lane in the vehicle width direction and the current location of the own vehicle.

Figure 3:
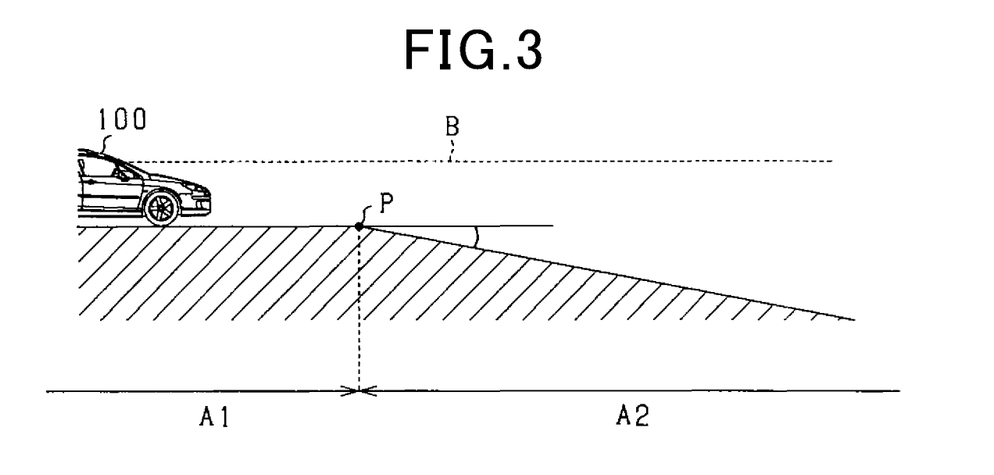
FIG. 3 is a diagram showing an own vehicle travelling on a road having a slope.

FIG. 3 is a diagram showing a state where the own vehicle travels on a road having a road slope ahead of the own vehicle, which is viewed from a horizontal direction of the own vehicle. In FIG. 3, a slope change point P is present ahead of the own vehicle and the road slope decreases from the slope change point P to a vehicle distance side A2. According to the present embodiment, a case where the road slope from the slope change point P to the vehicle distance side A2 is inclined downward with respect to the road slope from the slope change point P to a vehicle vicinity side A1, is referred to as a decrease in road slope. On the other hand, a case where the road slope from the slope change point P to the vehicle distance side A2 is inclined upward with respect to the road slope from the slope change point P to a vehicle vicinity side A1, is referred to as an increase in road slope. Note that as a case where the road slope decreases, for example, it is expected that state of the road changes from a flat road to a downhill road. As a case where the road slope increases, for example, it is expected that the state of the road changes from a flat road to an uphill road.

When the road slope changes on the road where the own vehicle travels, a distance between the capturing axis B and the road surface in the height direction varies around the slope change point P and may cause a distortion of the marking in the road width direction in the captured image. Also, when the own vehicle changes its direction while travelling on such a road to approach either left or right marking, a degree of distortion differs between respective side markings in the captured image.

Figure 4A:
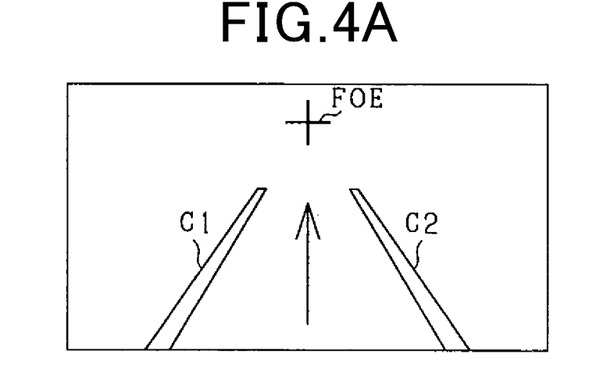
FIGS. 4A and 4B are diagrams each showing a captured image.
Figure 4B:
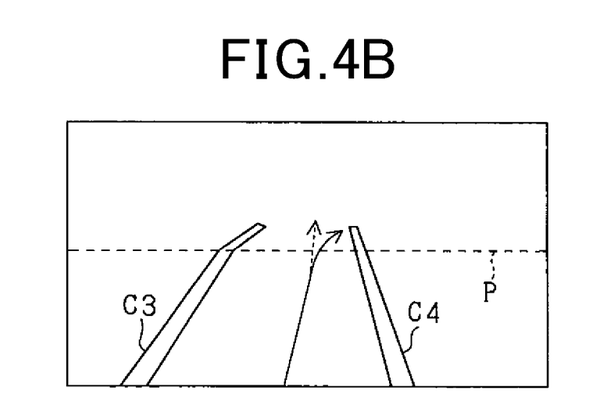

FIG. 4A illustrates a captured image when the own vehicle travels on a straight road having no road slope. FIG. 4B illustrates a captured image when the own vehicle travels on a straight road having a road slope shown in FIG. 3 and changes its direction to right direction. In FIGS. 4A and 4B, a travelling direction of the own vehicle is indicated by an arrow. According to the present embodiment, presence of the road slope refers to a change in the road slope being larger than or equal to a predetermined value, and absence of the road slope refers to the road slope being less than the predetermined value.

When the own vehicle travels on a straight road without a change in the road slope, as shown in FIG. 4A, left side markings C1 C2 extend linearly towards a vanishing point FOE from a vehicle vicinity side. On the other hand, when the own vehicle changes its direction to a right direction while travelling on the straight road having a road slope, as shown in FIG. 4B, the left right markings C3 and C4 extend towards the vanishing point FOE in a region from the slope change point P to the vehicle vicinity side. Note that position of the FOE is omitted for convenience of the explanation. Meanwhile, in the vehicle distance side further than the slope change point P, the left side marking C3 does not extend towards the vanishing point FOE, but is distorted inside in the vehicle width direction compared to the right side marking C4.

In the case where the ECU 10 estimates the road curvature using both sides markings (i.e. left and right markings), due to a difference of the distortion between the left-right markings in the captured image, the road curvature may be set to be a value smaller than the actual road curvature and an unnecessary steering amount may be applied to the own vehicle. For example, when the own vehicle travels on a straight road with a change in the road slope, since the road curvature is estimated to be a value smaller than the actual road curvature, it is possible that the own vehicle is unable to travel along the straight road because of applying a steering amount in either left or right direction. The travelling route indicated by a dotted line shown in FIG. 4B is an expected travelling route of the own vehicle when assuming that the steering control is performed using the road curvature estimated with the marking having no distortion. According to an example of FIG. 4B, a steering amount in the right direction is applied to the own vehicle, whereby the travelling route of the own vehicle is shifted to the right direction with respect to the expected travelling route indicated by the dotted line.

In this respect, the ECU 10 applies a restriction to the steering control during a state where a change in the road slope ahead of the own vehicle has been detected and a change in the direction of the own vehicle has been detected. Specifically, the ECU 10 sets a steering change rate R when increasing the steering amount to be a value smaller than a reference value, thereby restricting the steering control.

As a determination whether a change in the road slope is present, a known optical flow method is used for the determination according to the present embodiment. The optical flow indicates a movement vector of a pixel that constitutes an object in the captured image. In a flat road in which the road slope is not changed, in the captured image, a stationary object appears from the vanishing point FOE and the optical flow of the stationary object is recognized as a line segment extending in the vehicle width direction when approaching the vehicle vicinity side from the vehicle distance side. On the other hand, when the road slope changes ahead of the own vehicle, the stationary object does not appear from the vanishing point so that the optical flow of the stationary object is not linear. For example, when the road slope decreases more in the vehicle distance side than in the slope change point P, the stationary object appears from lower side than the FOE point in the captured image. Also, when the road slope increases further away than the slope change point P, the stationary object appears from the upper side than the FOE point. Hence, the ECU 10 detects, in the captured image, stationary objects such as electric poles, signs, signals and street trees in accordance with a known pattern matching method using dictionary information, and calculates a change in the optical flow around the FOE point in the detected stationary object. Then, the ECU 10 determines whether a change in the road slope is present based on a change in the optical flow.

Figure 5:
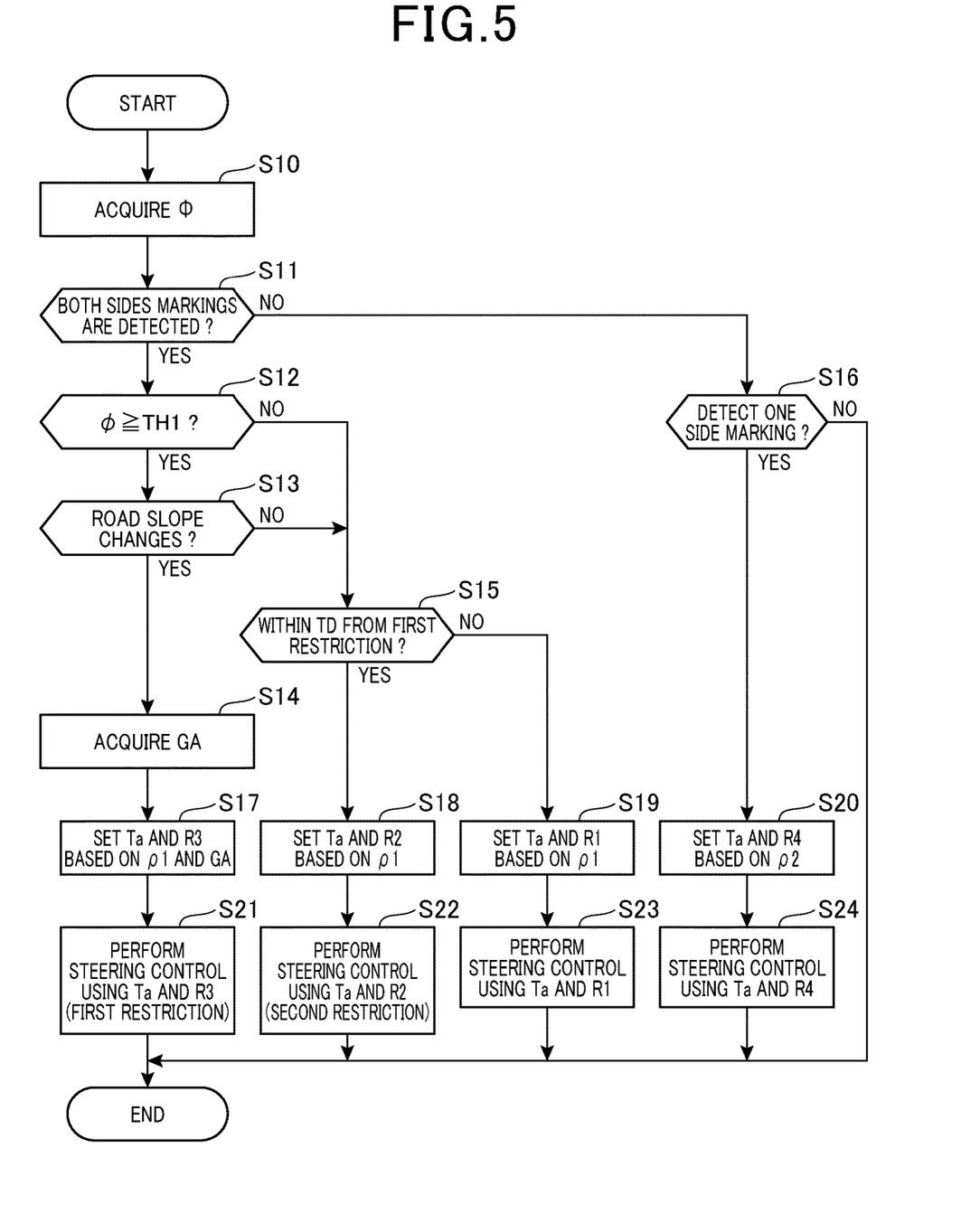
FIG. 5 is a flowchart showing a process of setting a steering amount.

Next, with reference to the flowchart shown in FIG. 5, a procedure for executing the steering control will be described. The flowchart shown in FIG. 5 is repeatedly executed by the ECU 10 at predetermined periods.

At step S10, the process acquires a yaw angle φ of the own vehicle detected by the yaw angle sensor 14. According to the present embodiment, step S10 corresponds to a yaw angle acquiring unit. The yaw angle changes depending on the direction of the own vehicle.

At step S11, the process determines whether both of the left right markings have been detected. At step 11, when determined that left right markings have been detected, the process proceeds to step S12.

At step S12, the process determines that whether a direction of the own vehicle is changed. According to the present embodiment, the process determines that the direction of the own vehicle is changed when the yaw angle φ detected by the yaw angle sensor 14 is larger than or equal to a threshold TH1. Step S12 corresponds to a change determination unit.

At step S12, when it is determined that the direction of the own vehicle is not changed, the process proceeds to step S15 and determines whether a predetermined period has elapsed from a time when the steering control is executed using each steering control values Ta and R3 shown in step S21. Here, assuming that the predetermined period has not elapsed from the time when the steering control is executed, the process proceeds to step S19.

When the process proceeds to step S19, the process sets a target steering amount Ta and a first steering change rate R1 based on the first curvature ρ1 estimated using left and right markings. For example, a map which defines a relationship between the target steering amount Ta and the first steering change rate R1 is prepared and stored. Then, by referring the map, the process sets each of the steering control values Ta and R1.

At step S23, the process performs a steering control using each of the steering control values Ta and R1 which have been set at step S19.

Referring back to step S12, when the process determines that the direction of the own vehicle has changed, the process proceeds to step S13 and determines whether a change in the road slope is present ahead of the own vehicle. When it is determined that there is no change in the road slope ahead of the own vehicle, the process proceeds to step S15. The step S13 corresponds to slope determination unit.

On the other hand, at step S12, when the process determines that a change in the road slope is present ahead of the own vehicle, the process proceeds to step S14. The difference of amount of distortion between the left and right markings in the captured image varies depending on a change amount GA of the road slope the direction of the own vehicle. Specifically, as a change in the road slope becomes larger, in the captured image, distortion of the marking in the road width direction becomes larger in the vehicle distance side than the slope change point P. Also, as the yaw angle detected in the own vehicle becomes larger, the difference between the left and right markings becomes larger. Hence, at step S14, the change amount GA of the road slope is acquired first.

The change amount GA of the road slope refers to a change amount of a relative slope angle on the road sections between the vehicle vicinity side and the vehicle distance side with respect to the slope change point P. For example, at step S13, the process stores a slope change amount map which defines a correspondence between a direction of the optical flow used for determination whether a change in the road slope is present, and the change amount GA of the road slope. Then, the process may acquire, from the slope change amount map, the change amount GA corresponding to the direction of the optical flow used for the determination at step S13. Step S14 corresponds to a change amount acquiring unit.

Figure 6:
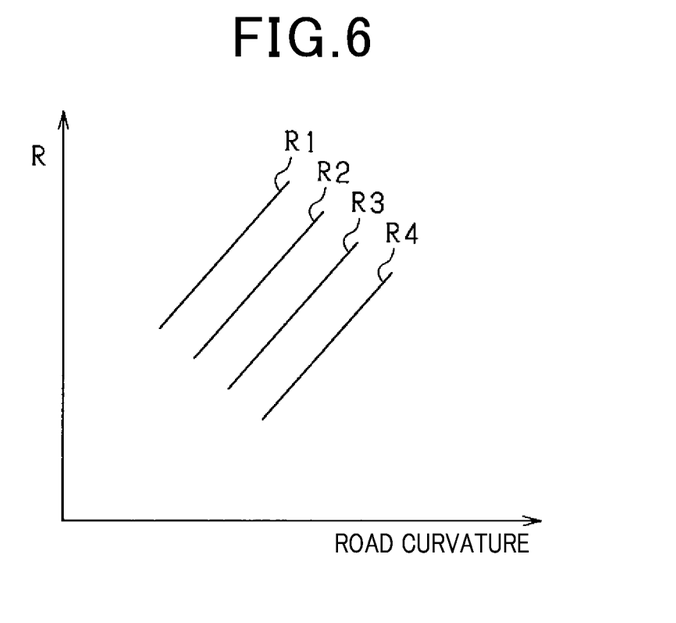
FIG. 6 is a diagram showing a steering change rate set by ECU (electro control unit)
Figure 7:
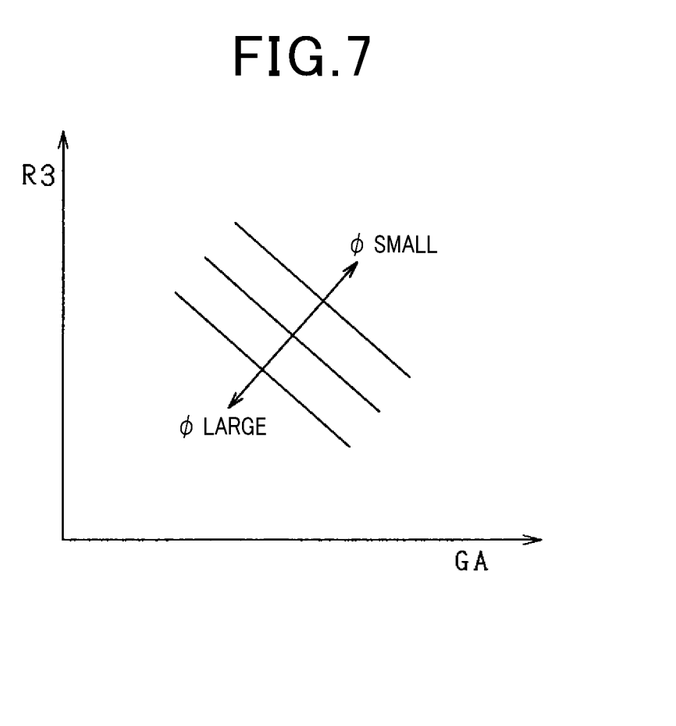
FIG. 7 is a diagram showing a steering change rate set by ECU.

At step S17, the process sets the target steering amount Ta and a third steering change rate R3 based on the first curvature ρ1. At this moment, the process sets the third steering change rate R3 based on the yaw angle φ and the change amount GA. As shown in FIG. 6, when the road curvature is the same value, the third steering change rate R3 is smaller than the first steering change rate R1.

According to the present embodiment, the larger the yaw angle φ and the change amount GA, the smaller the third steering change rate R3 is. For example, a steering amount map is stored in advance, which defines a correspondence between a combination of the first curvature ρ1, the yaw angle φ and the change amount GA, and a combination of the target steering amount Ta and the third steering change rate R3. Then, by referring to the steering amount map, the process may set the target steering amount Ta and the third steering change rate R3. Note that the maximum value of the third steering change rate R3 which is set depending on the yaw angle φ and the change amount GA is smaller than the first steering change rate R1.

Referring back to FIG. 5, at step S21, the process performs a steering control using each of the steering control values Ta and R3 which have been set at step S17. Hence, in the steering control at step S21, the steering change rate is more restricted than a case where the steering control is performed at step S23. According to the present embodiment, performing the steering control using each of the steering control values Ta and R3 corresponds to a first restriction.

Referring back to step S15, when the process determines that it is in a continuous period DT from the steering control at step S21, the process proceeds to step S18. At step S18, the process sets the target steering amount Ta and the second steering change rate R2 based on the first curvature ρ1.

A reason for setting the second steering change rate R2 at step S18 will be described. FIGS. 8A to 8D are diagrams showing a change in the position of the own vehicle when the own vehicle travels on a curved road including a slope change point P. Changing from FIGS. 8A to 8D, time elapses from t1 to t4.

Figure 8A:
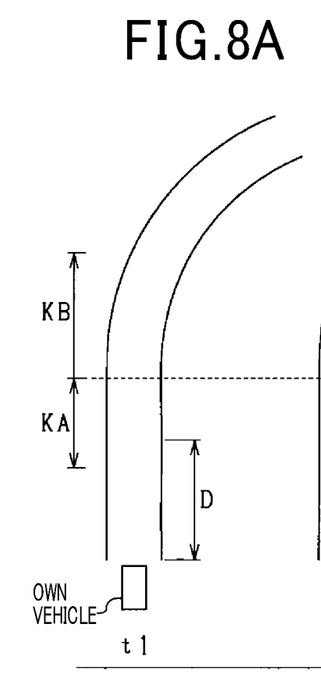
FIGS. 8A to 8D are diagrams each showing a change in a position of the own vehicle when the own vehicle travels on a curved road.
Figure 8B:
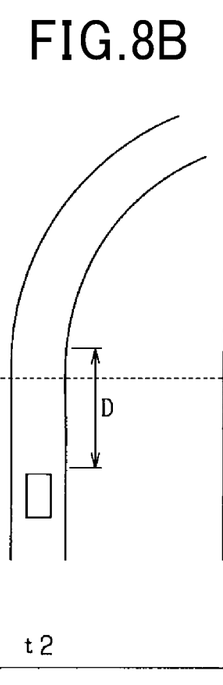
Figure 8C:
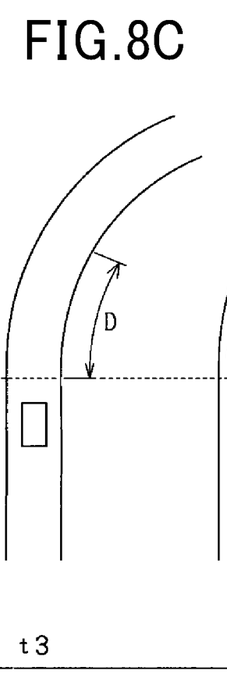

At time t1 shown in FIG. 8A, the road curvature is estimated with both left and right markings in the section D. After that, at time t2, when the own vehicle travels in the section D, steering control using the road curvature estimated at time t1 is performed. Similarly, at time t2, the road curvature in the section D is estimated using both of the left and right markings. Then, at time t3, steering control using the road curvature estimated at time t1 is performed. Similarly, at time t2, the road curvature in the section D is estimated using the left and right markings. Thereafter, at time t3, when the own vehicle travels on the section D, steering control using the road curvature estimated at time t2 is performed.

Figure 8D:
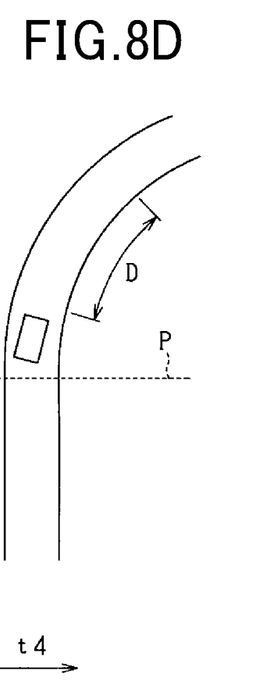

The ECU 10 performs an averaging process of the road curvature calculated at a predetermined period, thereby estimating the current value of the road curvature. Hence, as shown in FIG. 8D, immediately after the own vehicle passes the slope change point P, the direction of the travelling route of the own vehicle may be influenced by the road curvature estimated using both of the left and right markings having different degrees of distortion In this respect, according to the present embodiment, the steering control is continuously restricted at a travelling section in the vehicle vicinity side and a travelling section in the vehicle distance side with respect to the slope change point. For example, in FIGS. 8A to 8D, the steering control is restricted in the traveling section KB which is a distance side of the own vehicle with respect to the slope change point P, in addition to the travelling section KA which is a vicinity side own vehicle with respect to the slope change point P. According to the present embodiment, respective travelling sections KA and KB are set as sections different from the sections shown in FIGS. 8A to 8D, but may be set in the same sections. Also, in FIGS. 8A to 8D, the travelling section KB is set to be longer than the travelling section KA. However, the lengths of respective sections KA and KB may be appropriately set depending on the restriction applied to the steering control. The travelling section KA corresponds to a first traveling section and the travelling section KB corresponds to the second travelling section KB.

The continuous period DT determined at step S15 refers to a required period from a time when the own vehicle passes through the slope change point P to a time when the own vehicle passes through the travelling section KB. For example, the continuous period DT may be changed depending on the traveling speed of the own vehicle. According to the present embodiment, as shown in FIG. 6, the second steering change rate R2 which is set at step S18 is larger than or equal to the third steering change rate R3 and smaller than the first steering change rate R1.

At step S22, the process executes steering control using the target steering amount Ta and the second steering change rate R2 which are set at step S18. Hence, during the continuous period DT after completing the steering control at step S21, the steering control is continuously restricted. According to the present embodiment, execution of the steering control using each of the steering control values Ta and R2 corresponds to a second limit.

Meanwhile, at step S11, when the process determines that both of the left and right markings have not been detected, the process proceeds to step S16. At step S16, the process determines whether either one of the left and right markings has been detected.

When the process determines that one side marking in the left and right markings has been detected at step S16, at step S20, the process sets the target steering amount Ta and the fourth steering change rate R4 based on the second curvature ρ2 estimated using the one side marking in the left and right markings. For example, a map which defines a relationship between the target steering amount Ta and the fourth steering change rate R4 in accordance with the second curvature ρ2 is prepared and stored. Then, by referring to the map, the process sets the target steering amount Ta and the fourth steering change rate R4 corresponding to the second curvature ρ2.

According to the present embodiment, as shown in FIG. 6, the fourth steering change rate R4 is set to be lower than the first to third steering change rates R1 to R3. This is because the first curvature ρ1 estimated using both of the left and right markings is larger than the second curvature ρ2 estimated using one side marking in the left and right markings.

At step S24, the process performs a steering control using the steering control values Ta and R4 which have been set at step S20. It should be noted that when the process determines that onside marking in both left and right markings have not been detected, the process temporarily terminated the process shown in FIG. 5.

According to the present embodiment, steps S17 to S24 correspond to a control unit. When processes of steps S21 to S24 are completed, the process temporarily terminates the process shown in FIG. 5.

According to the present embodiment, the following effects and advantages can be obtained.

The ECU 10 determines whether the direction of the own vehicle has changed with respect to a direction where the own lane extends, and determines whether the road slope ahead of the own vehicle has changed. Then, the steering control is restricted (restriction is applied to the steering control) based on the first curvature ρ1, when the process determines that the direction of the own vehicle changes and the road slope ahead of the own vehicle changes. In this case, the own vehicle can be prevented from being applied with an unnecessary steering amount depending on a difference of degree of distortion between the left and right markings.

The difference of degree of distortion between the left and right markings, which may influence an estimation error of the road curvature, becomes a value corresponding to a change amount GA of the road slope and a yaw angle φ. In this respect, the ECU 10 sets a degree of restriction of the steering control to be variable. In this case, the steering control can be prevented from being applied with unnecessary restriction by setting the restriction to be variable depending on the difference of degree of distortions.

The ECU 10 continuously applies restriction to the steering control in traveling sections of the vehicle vicinity side and the vehicle distance side with respect to the slope change point P when determining that the direction of the own vehicle changes and the road slope changes. In this case, the steering control is prevented from being influenced by the difference of the distortion between the left and right markings in the captured image even after the own vehicle passes through the slope change point P, and the direction of the own vehicle can be prevented from being excessively shifted to either left or right marking.

The ECU 10 applies a first restriction to the steering control when the own vehicle travels in a vehicle vicinity side section with respect to the slope change point P, and applies a second restriction of which the degree of restriction is weaker than that of the first restriction when the own vehicle travels in a vehicle distance side with respect to the slope change point P. In this case, the steering control can be prevented from being applied with unnecessary restriction after the own vehicle passes through the slope change point P.

Second Embodiment

In the second embodiment, configurations which differ from the first embodiment will be described. Note that portions having the same reference numbers represent the same portion and explanation thereof is not repeated.

As the change in the road slope according to the second embodiment, a case of increasing road slope and a case of decreasing road slope are distinguished, and the steering change rate in the case of decreasing road slope is set to be lower than the steering change rate of the case of increasing road slope. An example of decreasing road slope is a case where the road changes from the flat road to the down slope.

Figure 9A:
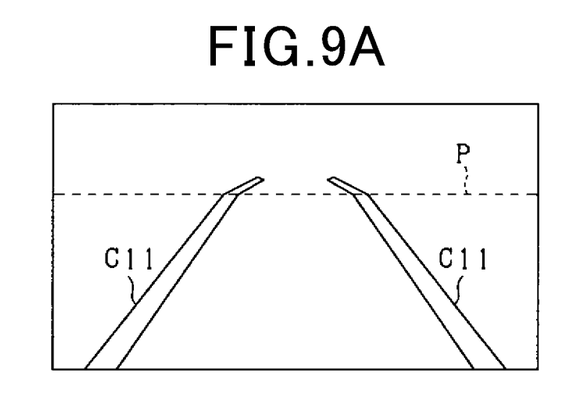
FIGS. 9A and 9B are diagrams each showing a difference between cases where a road slope is changed.
Figure 9B:
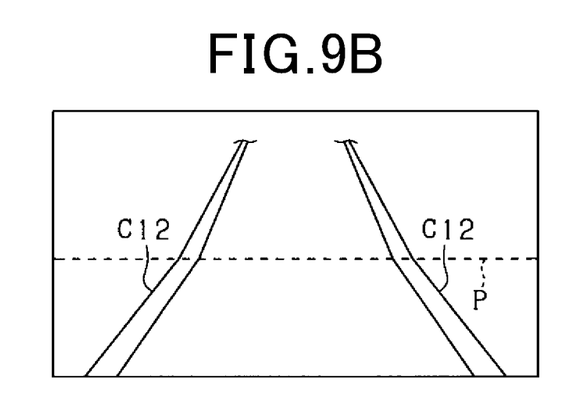

FIG. 9A illustrates a captured image in which the road slope ahead of the own vehicle decreases on a straight road, and FIG. 9B illustrates a captured image in which the road slope ahead of the own vehicle increases on a straight road.

When steering control such as LKA (i.e. lane keeping assist) control is performed, the steering amount is controlled such that the own vehicle travels along the marking. Here, as shown in FIG. 9A, when the road slope decreases, in the captured image, both of the left and right markings C11 and C11 are distorted/deformed inward in the distance side with respect to the slope change point P, whereby the left and right markings C11 and C11 may be disappeared. On the other hand, as shown in FIG. 9B, when the road slope increases, in the captured image, both of the left and right markings C11 and C11 are distorted/deformed outward in the distance side with respect to the slope change point P, however, the both markings are not disappeared. Hence, comparing a case where the road slope decreases and a case where the road slope increases, in the former case, the markings used for estimating the road curvature becomes excessively small so that the accuracy for estimating the road curvature decreases. As a result, steering control may be affected by these excessively small markings.

In this regard, according to the present embodiment, when it is determined that a change in the road slope decreases, the ECU 10 strengthens the restriction applied to the steering control more than a case where a change in the road slope increases.

Figure 10:
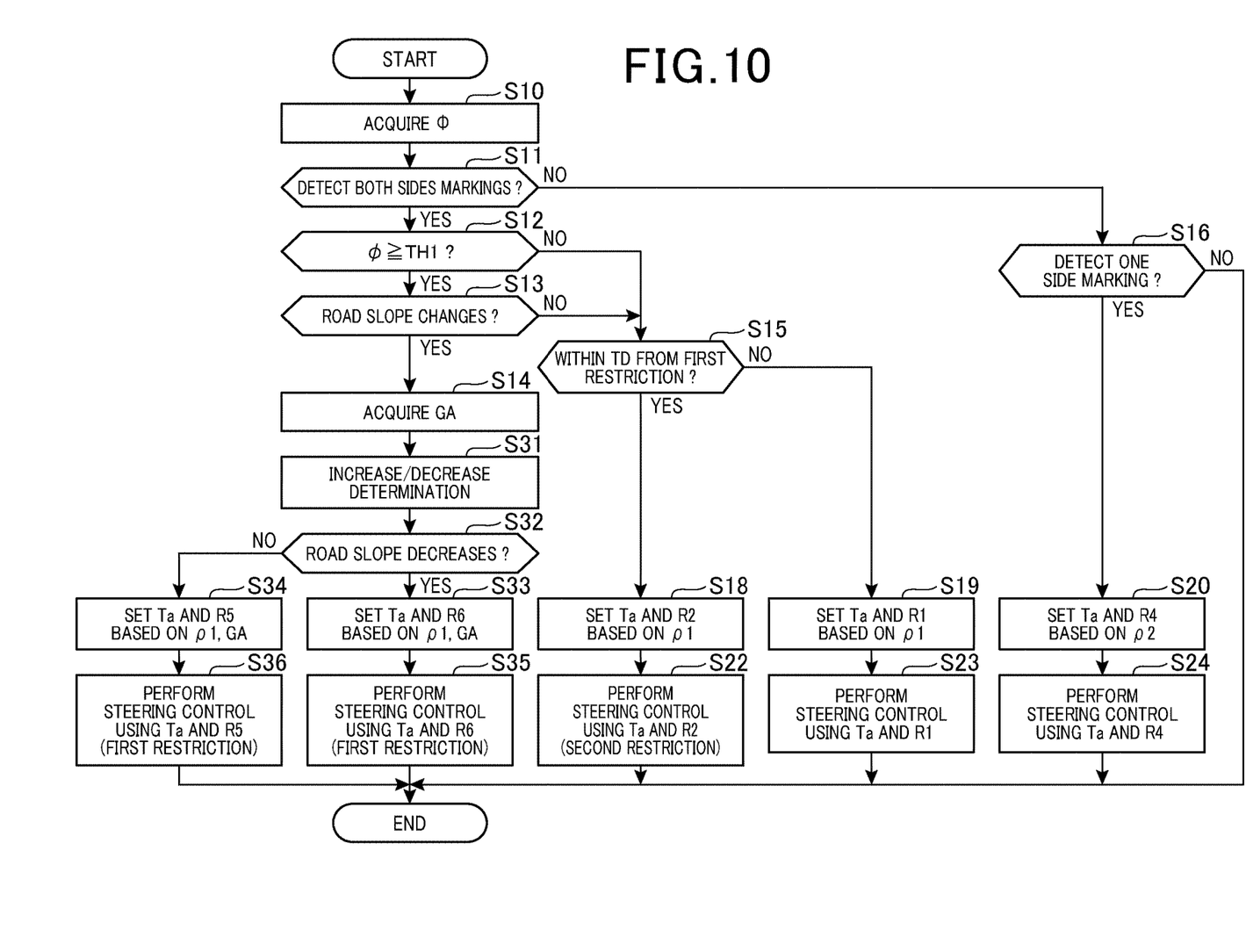
FIG. 10 is a flowchart showing a process for setting a steering control value according to a second embodiment.

A process of the steering control according to the second embodiment will be described with reference to the flowchart shown in FIG. 10. The flowchart shown in FIG. 10 is repeatedly executed at a predetermined period.

At step S13, when the process determines that a change in the road slope is present, the process proceeds to step S14 and acquires a change amount GA of the road slope.

At step S31, the process determines whether the road slope is increasing or decreasing (i.e. increase/decrease determination). The increase/decrease determination of the road slope may be performed using the optical flow used for the determination whether a change in the road slope is present. In this case, when the optical flow is formed such that the stationary object appears from an upper side with respect to the vanishing point FOE in the captured image, the process can determine that the road slope ahead of the own vehicle increases. On the other hand, when the optical flow is formed such that the stationary object appears from the lower side with respect to the vanishing point FOE in the captured image, the process can determine that the road slope ahead of the own vehicle decreases. Step 31 corresponds to increase/decrease determination unit.

On the other hand, at step S32, when the process determines that the road slope changes in the increase/decrease determination, the process proceeds to step S34, and acquires the target steering amount Ta and the fifth steering changer rate R5 based on the first curvature ρ1. At step S36, the process performs a steering control based on the target steering amount Ta and the fifth steering change rate R5.

At step S32, when the increase/decrease determination determines that the road slope decreases, the process proceeds to step S33, and sets the target steering amount Ta and sixth steering change rate R6. Since the sixth steering change rate R6 is a value which is set when the process determines that the road slope decreases, the sixth steering change rate R6 is set to be lower than the fifth steering change rate R5 while the same road curvature and the same change amount GA are maintained.

At step S35, the steering control is performed based on the target steering mount Ta and the sixth steering change rate R6.

When the processes of steps S22 to 24, S35 and S36 are completed, the process in FIG. 10 is temporarily terminated.

According to the present embodiment as described above, the ECU 10 determines the road slope whether increases or decreases, when a change in the road slope is determined. When the ECU 10 determines that the road slope decreases, the ECU 10 strengthens the restriction applied to the steering control more than a case where a change in the road slope increases. In this case, the steering control can be restricted to safer side for a direction of a change in the road slope which worsen the estimation accuracy of the road curvature among the roads in which a slope change is present.

Third Embodiment

In the third embodiment, configurations which differ from the first embodiment will be described. Note that portions having the same reference numbers represent the same portion and explanation thereof is not repeated.

Figure 11:
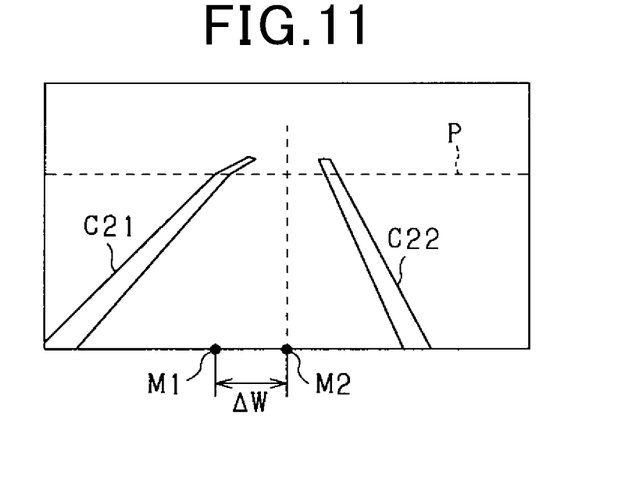
FIG. 11 is a diagram showing a theory of technique in a third embodiment.

FIG. 11 is a diagram showing a theory of technique in the third embodiment. When the own vehicle travels closely to either left or right marking with respect to the center of the own lane, in the captured image, one side marking C21 in the distance side of the own vehicle shows larger distortion than that of one side marking C22 in the vicinity side of the own vehicle. The difference of a degree of distortion between the left and tight markings C21 and C22 appears such that the farther the own vehicle position M2 from the center of the own lane in the vehicle width direction, the larger the difference of degree of the distortion.

In this respect, according to the present embodiment, unlike the first embodiment, a deviation $\Delta W$ defined as a deviation of distance between the center M of the own lane and the own vehicle position M2 in the vehicle width direction is calculated and the restriction applied to the steering control is determined such that the larger the deviation $\Delta W$, the more strengthen the degree of restriction. In this case, during a setting of the third steering change rate R3 at step S17, the center M1 of the own lane is calculated using both of the left and right markings for example. Then, a distance between the calculated center M1 of the own lane and the own vehicle position M2 is calculated as the deviation $\Delta W$.

For example, in the captured image, the center of the vehicle width direction indicating the imaging axis may be used as the own vehicle position M2. Also, a steering amount map may be stored in advance, which defines a correspondence between a combination of the first curvature $\rho 1$, the yaw angle $\varphi$, the change amount GA and the deviation $\Delta W$, and the third steering change rate R3. Then, by referring to the steering map, the third steering change rate R3 may be set. The ECU 10 corresponds to a deviation calculation unit.

According to the present embodiment as described above, the ECU 10 calculates the deviation $\Delta W$, and sets the degree of restriction applied to the steering control such that the larger the calculated deviation $\Delta W$, the stronger the degree of the restriction. In this case, unnecessary steering amount caused by the own vehicle position can be avoided.

Fourth Embodiment

Figure 12:
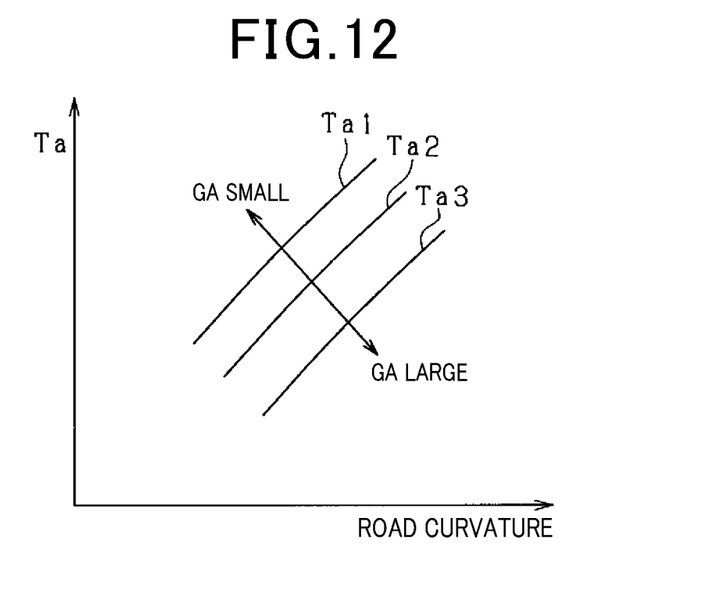
FIG. 12 is a diagram showing a target steering amount set by ECU according to a fourth embodiment.

When a change in the road slope is determined, the target steering angle Ta may be restricted instead of the steering change rate R. FIG. 12 is a diagram showing a target steering amount set by ECU 10 according to the fourth embodiment.

In this case, at steps S17 and S18, depending on the first curvature $\rho 1$ and the change amount GA of the road slope, the target steering amount Ta is set. Specifically, the target steering amount Ta set at step S17 is set such that the larger the change amount GA of the road slope, the smaller the target steering amount Ta is as long as the road curvature is the same value. Also, the upper limit value of the target steering amount Ta set at the step S17 may be determined to be less than or equal to the target steering amount Ta set at step S19.

Modification 1 of Fourth Embodiment

When a change in the road slope is determined, the ECU 10 may change a restriction value of the steering angle to add the restriction to the steering control. In this case, at steps S17 and S18, the ECU 10 may set the target steering angle Ta and the steering change rate R, together with the restriction value of the steering angle. Further, the restriction value of the steering angle set at step S17 is set such that the larger the change amount GA of the road slope, the smaller the upper limit value of the steering angle is.

Modification 2 of Fourth Embodiment

The ECU 10 may apply the restriction to the steering control by changing each of t the restriction value of the target steering amount Ta, the steering change rate R, and of the steering angle. For example, the ECU 10 may set respective restriction values of the target steering amount Ta, the steering change rate R and the steering angle so as to strengthen the restriction of the steering control.

Other Embodiments

When a change in the road slope is determined, the ECU 10 may set each of the steering control values Ta and R3 to be a fixed value, instead of changing the steering control values Ta and R3 depending on the change amount GA of the road slope. In this case, when a change in the road slope is determined at step S13 shown in FIG. 5, the process proceeds to step S17 and sets each of the steering control values Ta and R3.

The ECU 10 may perform no steering control when the change amount GA of the road slope acquired at step S14 is larger than a predetermined controllable threshold at which the steering control can be performed.

In the determination at step S15, the process may proceed to step S18 while the own vehicle travels for a predetermined travel distance after applying the restriction to the steering control at step 21.

The ECU 10 may perform, instead of using LKA control, a lane departure prevention control that issues an alert to the driver when the own vehicle is departing from the own lane across the marking. Even in this case, when the ECU 10 detects a change in the direction of the own vehicle and a change in the road slope, the ECU 10 may add a restriction to the steering control.

In the case where the steering control system 100 is provided with a navigation system storing map information, the ECU 10 may determine a change in the road slope based on the absolute coordinate on the road and a slope angle of each section on the road which constitute the map information. In this case, at step S13, the map information may be used to detect a location at which a change in the slope angle is present on the road, thereby detecting a change in the road slope.

When the steering control system 100 includes a navigation system, by using the map information, the change amount GA of the road slope may be acquired at step S13, and an increase/decrease determination of the road slope may be performed at step S31.

What is claimed is:

1. A vehicle control apparatus comprising:
   one or more processors comprising:
      a marking detection unit that detects a marking defining an own lane based on an image of a region ahead of an own vehicle captured by an imaging device;
      a curvature estimation unit that estimates a curvature of the own lane ahead of the own vehicle based on both of left and right markings detected by the marking detection unit;
      a control unit that performs a steering control of the own vehicle based on the curvature of the own lane estimated by the curvature estimation unit;
      a change determination unit that determines whether a direction of the own vehicle has changed with respect to a direction where the own lane extends; and
      a slope determination unit that determines whether a change in a road slope is present ahead of the own vehicle,
   wherein
      the control unit is configured to inhibit influence of an estimation error of the curvature of the own lane estimated by the curvature estimation unit that is caused by a difference of degree of distortion between the left and right markings in the image due to the change in the road slope by applying a restriction to the steering control performed based on the curvature of the own lane during a state where a change in the direction of the own vehicle has been detected and a change in the road slope ahead of the own vehicle has been detected.

2. The vehicle control apparatus according to claim 1 further comprising:
   a yaw angle acquiring unit that acquires a yaw angle that changes depending on a direction of the own vehicle; and
   a change amount acquiring unit that acquires a change amount of the road slope when the slope determination unit determines that the road slope changes, wherein
   the control unit is configured to set a degree of the restriction to be variable based on the yaw angle acquired by the yaw angle acquiring unit and the change amount acquired by the change amount acquiring unit.

3. The vehicle control apparatus according to claim 1 further comprising
   an increase/decrease determination unit that determines whether the road slope is increasing or decreasing when determining that the road slope changes, wherein
   the control unit is configured to strengthen the restriction applied to the steering control more than a case where the road slope increases when the increase/decrease determination unit determines that the road slope decreases.

4. The vehicle control apparatus according to claim 1 further comprising
   a deviation calculation unit that calculate a deviation of distance between a center of the own lane and a position of the own vehicle in a vehicle width direction, wherein
   the control unit is configured to increase a degree of the restriction such that the restriction increases as the deviation calculated by the deviation calculation unit increases.

5. The vehicle control apparatus according to claim 1, wherein
   in response to the marking detection unit detecting both of left and right markings, the change determination unit determines whether the direction of the own vehicle has changed,
   in response to the change determination unit determining that the direction of the own vehicle has changed, the slope determination unit determines whether a change in a road slope is present ahead of the own vehicle,
   in response to the slope determination unit determining that a change in a road slope is present ahead of the own vehicle, a change amount acquiring unit acquires a change amount of the road slope, and
   based on the change amount of the slope acquired by the change amount acquiring unit and the curvature of the own lane estimated by the curvature estimation unit, the control unit
      sets a target steering amount and a steering change rate, and
      performs the steering control of the own vehicle according to the target steering amount and the steering change rate.

6. The vehicle control apparatus according to claim 1, wherein
   the curvature estimation unit is configured to calculate the curvature based on both of left and right markings at a predetermined period and perform a smoothing process of the curvature calculated at the predetermined period to estimate a current value of the curvature; and
   the control unit is configured to perform the steering control based on the current value of the curvature, and continuously apply the restriction to the steering control in a first travelling section which is a vicinity side of the own vehicle with respect to a change point of the road slope and a second travelling section which is a distance side of the own vehicle when determining that the direction of the own vehicle changes and the road slope changes.

7. The vehicle control apparatus according to claim 3, wherein
   the control unit is configured to apply a first restriction to the steering control when the own vehicle travels in the first travelling section, and apply a second restriction of which a degree of restriction of the second restriction is less than that of the first restriction to the steering control when the own vehicle travels in the second travelling section.

8. The vehicle control apparatus according to claim 1, wherein
   wherein the restriction comprises performing the steering control according to at least one of a target steering amount and a steering change rate.

9. The vehicle control apparatus according to claim 8, wherein the steering change rate increases as the curvature of the own lane increases.

10. The vehicle control apparatus according to claim 8, wherein the steering change rate decreases as a yaw angle of the vehicle increases, and the steering change rate decreases as a change amount of the road slope increases.

11. A vehicle control apparatus comprising:
one or more processors comprising:
   a marking detection unit that detects a marking defining an own lane based on an image ahead of an own vehicle captured by an imaging device;
   a curvature estimation unit that estimates a curvature of the own lane ahead of the own vehicle based on both of left and right markings detected by the marking detection unit;
   a control unit that performs a steering control of the own vehicle based on the curvature of the own lane estimated by the curvature estimation unit;
   a change determination unit that determines a direction difference between a direction of the own vehicle and a direction of the own lane; and
   a slope determination unit that determines whether a change in a road slope is present ahead of the own vehicle, wherein the control unit is configured to inhibit influence of an estimation error of the curvature of the own lane estimated by the curvature estimation unit that is caused by a difference of degree of distortion between the left and right markings in the image due to the change in the road slope by applying a restriction to the steering control performed based on the curvature of the own lane when the direction difference determined by the change determination unit exceeds a predetermined difference and the slope determination unit determines that there is a change in the road slope ahead of the own vehicle.

* * * * *